Sept. 2, 1947.  J. J. BROPHY  2,426,666

SHOE AND METHOD OF MAKING SHOES

Filed March 25, 1943

INVENTOR

Patented Sept. 2, 1947

2,426,666

UNITED STATES PATENT OFFICE 2,426,666

SHOE AND METHOD OF MAKING SHOES

John J. Brophy, Salem, Mass., assignor to United Shoe Machinery Corporation, Flemington, N. J., a corporation of New Jersey Application March 25, 1943, Serial No. 480,507

17 Claims. (Cl. 36—12)

This invention relates to shoes and to methods of making shoes and has particular reference to the manufacture of welt shoes in which the outsole is attached to the shoe bottom by adhesive or cement rather than by stitching.

Objects of the present invention are to provide an improved method of making welt shoes in which the outsole is attached to the welt by cement or adhesive rather than by the usual stitches, and to provide an improved welt shoe made in accordance with the present method.

With these objects in view, the invention provides, in accordance with one aspect, an improved method of making welt shoes which involves the use of a welt composed of a synthetic plastic material which is relatively flexible or pliable but yet is sufficiently strong and resilient to function as a welt, the welt being composed of such plastic materials, for example, as vinyl resin, cellulose acetate or one of the similar plastic materials or copolymers that have come into use for various purposes during recent years, these materials being sufficiently flexible and resilient to be attached to a shoe upper by stitching or metallic fastenings, as well as by adhesive, and being also capable of being activated to render them tacky or adhesive.

As herein illustrated, a welt composed of a plastic material such as one of those referred to above is secured to the overlasted upper of a welt shoe in any usual or convenient manner as, for example, by stitching, stapling or by adhesion to the upper. An outsole is provided having inserted in its marginal portion plastic material of the same kind as, or compatible with, the plastic material forming the welt, the inner surface of the plastic material being located substantially flush with the inner or attaching surface of the outsole.

In accordance with the method disclosed herein, the marginal portion of the attaching surface of the outsole is treated with a suitable activator for the plastic material inserted therein, this activator, for example, in the case of cellulose acetate or a similar plastic material, comprising a solvent such as acetone or a light cement of that nature. The plastic material in the outsole is thus rendered soft and tacky or adhesive. The outsole is then positioned on the shoe bottom and pressure is applied in a sole attaching press or in some other convenient manner to attach the outsole adhesively to the plastic welt. As illustrated herein, the plastic material inserted in the marginal portion of the outsole may conveniently take the form of cylindrical pegs or pins which may be secured in openings or holes in the outsole by cement or by the adhesive nature of the plastic material itself when activated. Moreover, if desired, the plastic pegs may be secured in the outsole by other means, for example, by pins inserted inwardly from the edge face of the outsole and passing through the plastic pegs. The plastic pegs are preferably arranged in one or more rows extending around the marginal portion of the outsole and, to obtain the best results, they should be located relatively close together. In one form illustrated herein, the pegs are provided with annular abutments or shoulders which face inwardly toward the welt or the inner or attaching surface of the outsole and thus prevent the pegs from being pulled through the material of the outsole by the tension or strain exerted on the outsole during the wearing of the shoe.

While the present method calls for activating the outsole or the plastic pegs therein by a solvent or other activator, it is pointed out that, if desired, both the outsole and the welt could be activated and, in some instances at least, particularly when both the welt and the pegs are composed of the same kind of plastic material, only the outer or sole engaging surface of the welt need be activated to render it adhesive because the welt itself will then serve to activate the plastic pegs in the outsole and thereby insure that a strong permanent bond will be obtained between the welt and the outsole when the latter is pressed against the shoe bottom in the sole attaching operation.

In accordance with another aspect, the invention provides an improved welt shoe constructed through the practice of the present method and embodying the features disclosed herein, the shoe, as illustrated, comprising an upper, an insole, an outsole, and a welt, the welt being composed of synthetic plastic material. The outsole of the shoe has inserts such as pegs or pins of plastic material compatible with that of the welt secured in its marginal portion with the inner ends of the pegs located substantially flush with the attaching surface of the outsole. Although the entire welt adheres to the outsole, the outsole is attached to the shoe bottom mainly through the adhesion of the plastic pegs to the adjacent or sole engaging surface of the plastic welt, the uniting of these materials being accomplished by rendering the plastic materials adhesive or tacky and then pressing the outsole against the shoe bottom. The attachment of the outsole to the welt in this manner is strong and permanent because the uniting of these members has been effected through the virtual welding together or cohesion of the plastic material forming the welt with that inserted in the outsole.

With the above and other objects and aspects in view, the invention will now be described in connection with the accompanying drawings and will thereafter be pointed out in the claims.

Figure 1:
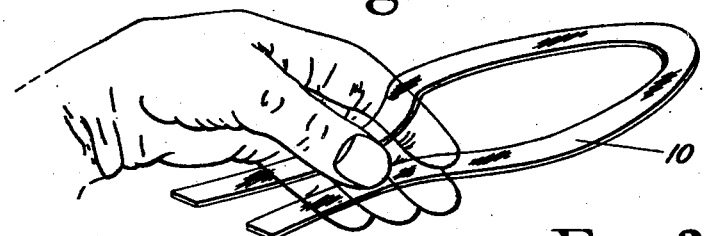
Fig. 1 is a perspective view of a plastic welt used in making the shoe of the present invention.

In carrying out the method of the present invention, as illustrated herein, a plastic welt 10 is cut from a strip or ribbon of plastic material or is died out of a flat sheet of plastic material the proper length for a welt, or so that it will extend from about the heel breast line at one side of the shoe to the same point at the opposite side thereof. As illustrated in Fig. 1, the welt 10 may be composed of a transparent plastic material, it may be opaque, or it may be colored to correspond to, or contrast with, the color of the shoe upper, for example, it may be colored gray, black, tan or red. The material of which the plastic welt is composed is preferably a synthetic plastic material which is sufficiently pliable or flexible to function as a welt but which is also capable of being activated to render it soft and adhesive either by heat or by a suitable solvent such as acetone or a cement of that nature. Moreover, the plastic material of the welt should have sufficient resiliency and resistance to tearing to permit it to be attached to the shoe, if desired, by stitches in the usual manner, that is, by the inseam stitches which ordinarily secure the welt to the overlasted upper and insole rib in a welt shoe. It is within the scope of the invention, however, to attach the plastic welt to the shoe by other means, if preferred, such as by metallic fastenings, cement, or by the adhesion of the welt itself to the overlasted upper.

Examples of plastic materials of which the welt may be composed are cellulose acetate or vinyl resins such as polyvinylidene chloride, known as "Saran," vinyl acetate, or other synthetic plastic materials of a similar nature and having the characteristics and properties mentioned above.

Figure 2:
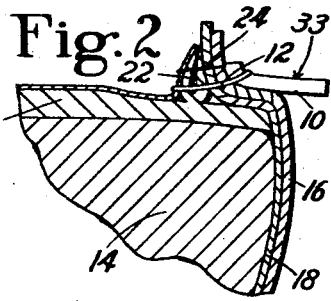
Fig. 2 is a fragmentary cross sectional view of one side of a welt shoe showing the plastic welt secured to the overlasted shoe bottom.

The plastic welt 10, in accordance with the present method, is attached to the overlasted bottom of a welt shoe, by inseam stitches 12, the shoe, as illustrated in Fig. 2, being mounted on a last 14 and comprising an upper 16, a lining 18, and an insole 20 provided with an upstanding lasting rib 22 to which the upper has been secured in overlasted position by staples or other fastenings 24. In sewing the plastic welt to the upper, an awl or needle in the stitching machine punches holes through the welt, upper and insole rib, and then inserts the thread through these holes, this operation ordinarily being performed on one machine which, by first punching the awl holes, eliminates any tendency of the welt to tear during the stitching operation. As pointed out above, the plastic welt may, if desired, be secured to the overlasted bottom of the welt shoe by metallic fastenings, such as staples, or by cementing the welt to the overlasted margin of the upper.

Figure 3:
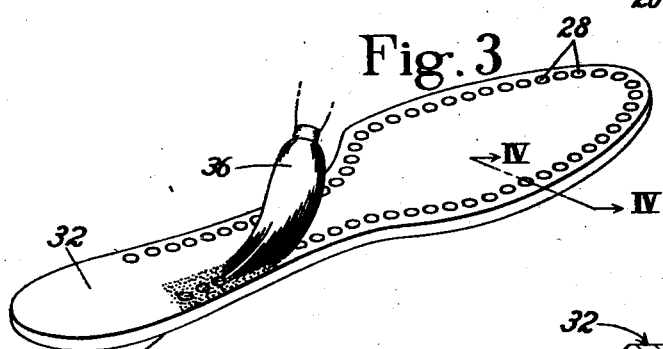
Fig. 3 is a perspective view of an outsole provided at its marginal portion with a pluraltiy of plastic inserts or pegs and illustrating the activating of the marginal portion of the outsole in accordance with the method disclosed herein.

An outsole 26 is next provided of the proper size and shape for the shoe being constructed, this outsole, as herein illustrated, being provided around its marginal portion with a plurality of plastic inserts or pegs 28, the pegs, as shown in Fig. 3, preferably being located in a row sufficiently close to the edge of the outsole to insure that they will engage the welt and extending from about the heel breast line at one side of the sole to the corresponding point at the opposite side thereof, these pegs, as illustrated, being positioned relatively close together. The pegs 28 are preferably composed of the same kind of plastic material as the welt 10 although this requirement is not absolutely essential to the successful performance of the method and, accordingly, the pegs may, if desired, be composed of a plastic material different from that of the welt provided it is a plastic that is compatible with the plastic material forming the welt. As herein illustrated, the pegs 28 may, for example, be composed of a plastic material such as cellulose acetate, vinyl resins such as vinyl acetate, polyvinylidene chloride or polyvinyl chloride, the same as the plastic welt 10, the pegs preferably being colored red, gray, black or some other shade to contrast with or show through the welt and thereby produce a pleasing design or color effect in the finished shoe.

Figure 4:
Fig. 4 is an enlarged transverse sectional view of one margin of the outsole taken on the line IV—IV of Fig. 3.

Figs. 3 and 4 illustrate the plastic pegs 28 as they appear in the marginal portion of the outsole 26, the pegs, as shown, being substantially cylindrical in shape but being reduced in size near their inner ends to provide an annular abutment or shoulder 30 thereon which faces inwardly or away from the tread surface of the outsole and tends to prevent the pegs from pulling upwardly through the outsole in the direction of its attaching surface under the strain or tension exerted upon the outsole during wearing of the shoe, the attaching face of the outsole being indicated in Figs. 3 and 4 by the numeral 32. The pegs 28 are preferably secured by cement in properly shaped openings or holes bored in the marginal portion of the outsole, or they may, if desired, be secured in the outsole by activating the pegs, themselves, to render them adhesive and then driving or pressing them into the preformed holes in the outsole. In practice, the cement or adhesive utilized for securing the pegs in the holes in the outsole must, of course, be compatible with the plastic material forming the pegs. For example, if the pegs are composed of a plastic material such as cellulose acetate, cellulose nitrate or ethyl cellulose, they can be secured in the holes in the outsole by pyroxylin cement. If, however, the pegs are composed of vinyl acetate or polyvinylidene chloride, pyroxylin cement would not stick such plastic materials in the outsole and, accordingly, a different kind of adhesive would have to be used, that is, one which is compatible with the plastic material forming the pegs; for example, in the case of vinyl acetate, a cement made up of acetone and toluol and a compatible vinyl base could be used while, on the other hand, if the pegs were composed of thermoplastic material such as polyvinylidene chloride, polyvinyl chloride, or some other vinyl resin soluble only with difficulty, they may be activated or rendered adhesive by heat and they can then be secured in the holes in the outsole by reason of their own adhesive condition. As illustrated in Fig. 4, the inner ends 34 of the plastic pegs 28 are located substantially flush with the inner or attaching surface 32 of the outsole and the pegs preferably extend through the full thickness of the outsole.

Figure 5:
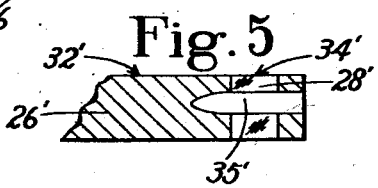
Fig. 5 is a sectional view similar to Fig. 4 of a different type of outsole.

It is also within the scope of the invention to provide the outsole with inserts or pegs other than the particular type illustrated in Figs. 3 and 4 and to secure the pegs in the outsole in a different manner or by different means. For example, Fig. 5 illustrates in cross section the marginal portion of another outsole 26' in which the holes formed in the margin are the same size throughout instead of being reduced or counterbored at one end, as in Fig. 4. This outsole is provided with cylindrical inserts or pegs 28' which extend completely through the outsole and the inner ends 34' of which are located substantially flush with the attaching face 32' of the outsole. In this construction, however, the plastic pegs 28' are secured in the holes in the outsole by fastening members or pins 35 which are preferably composed of plastic material, the same as the pegs 28' but may, if desired, be composed of some other material, such as leather, paper, or wood. As illustrated in Fig. 5, the pins 35 are inserted in holes extending inwardly through the edge face of the outsole and the pins pass through the plastic pegs 28' thereby securely fastening or locking the pegs in the holes in the outsole.

Figure 6:
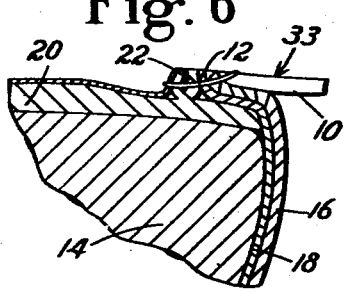
Fig. 6 is a cross sectional view, similar to Fig. 2, after the inseam of the shoe has been trimmed and the plastic welt has been straightened or beaten.

After the welt 10 has been attached to the shoe bottom by the inseam stitches 12 or in some other suitable manner, the inseam portion of the shoe is trimmed, as illustrated in Fig. 6, and the plastic welt is beaten in the usual manner to straighten or flatten it preparatory to laying the outsole, this operation preferably being performed by some conventional type of welt beating machine. The welt beating operation does not injure the plastic welt because the welt is not composed of a fibrous material such as leather and therefore cannot be pounded out of its original shape. The inner or attaching surface 32 of the outsole, that is, the surface which engages the adjacent surface of the welt 10, indicated in the drawings by the numeral 33, is next activated to render the inner ends of the pegs 28 tacky or adhesive and also to cause the leather of the outsole adjacent to the pegs and around the marginal portion of the outsole to become better adapted for adhesive attachment or, in other words, for activating the plastic welt. The activation of the marginal portion of the outsole and the plastic pegs therein is accomplished in the case of pegs of a material such as cellulose acetate or ethyl cellulose by means of a solvent such as acetone or a solvent combination of a similar nature, which may be applied to the marginal portion of the attaching surface 32 of the outsole by a suitable implement, such as a brush 36, as shown in Fig. 3. If the pegs are composed of vinyl resins such, for instance, as a copolymer of vinyl acetate and butyraldehyde, sometimes referred to a "Vinylite XYSG," a solvent such as alcohol should be used to activate them and to prepare the outsole, while in the case of polyvinylidene chloride, as stated above, heat may be applied to activate the pegs and render them adhesive.

It should also be pointed out that it may be desirable to activate the plastic pegs in the outsole and simultaneously to prepare the outsole for cement attachment to the shoe bottom by applying pyroxylin cement to the margin of the outsole provided the plastic material used is compatible with pyroxylin cement. The outsole may then either be cement attached to the welt immediately or before the pyroxylin has had time to dry, so that it will activate the plastic material of the welt and thus cause the welt to become fused or welded to the pegs and also stuck to the leather margin of the outsole, or it may be more convenient to let the pyroxylin cement on the outsole dry and to activate it later by a solvent such as acetone or a light cement of that nature when ready to attach the outsole to the shoe bottom. In any case, the outsole can be prepared for cement attachment to the shoe and the plastic pegs activated, and then the outsole can be applied to the shoe bottom to cause it to activate the plastic welt and thereby effect the cement attachment of the outsole to the welt. It should be borne in mind, however, that where pyroxylin cement is to be used, as stated above, the plastic material of the pegs and the welt must be compatible with such cement and also with the acetone used to activate it, such plastics, for example, as mentioned above being preferable, namely, cellulose acetate, ethyl cellulose or the proper types of vinyl resins, that is, those which react to solvents as previously explained.

It may further be pointed out that instead of activating the marginal portion of the outsole and the plastic pegs therein and then causing the engagement of the outsole with the welt to activate the latter and thus effect the adhesive attachment of the outsole to the welt, it is also feasible and within the scope of the invention to activate the plastic welt first by a solvent or other means and to permit the welt to activate the inner ends of the pegs in the outsole by engagement with the adhesive surface of the welt, this being especially true if the welt and pegs are composed of the same kind of plastic material and the parts are brought into engagement with each other promptly and placed under sole attaching pressure, as is usually done.

The final step in carrying out the method herein disclosed is to position the outsole 26 on the bottom of the shoe and to apply sole attaching pressure thereto while supporting the welt 10 in its outstanding or flat position during the pressure applying operation. The parts are maintained in pressure receiving position until the solvent or other activating agent has evaporated to a sufficient extent to permit the plastic material of the welt and pegs to harden after which the inner ends of the plastic pegs 28 in the outsole will have become firmly fused or "welded" to the outer or sole engaging surface 33 of the plastic welt 10 and the welt will be securely stuck to the leather marginal portion of the outsole, thereby permanently attaching the outsole to the shoe bottom.

Figure 7:
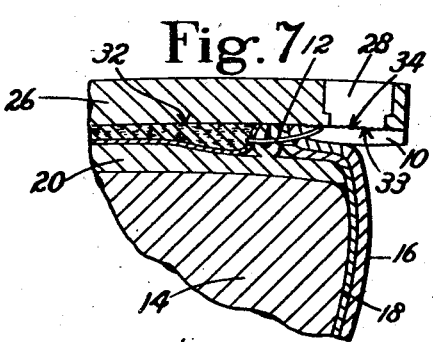
Fig. 7 is a view similar to Fig. 6 showing the outsole permanently attached to the shoe bottom through the adhesion of the pegs and outsole margin to the plastic welt.

Since the plastic material of the welt is the same as, or compatible with, the plastic material forming the pegs, the attachment of the outsole to the welt, as indicated above, is more than a mere sticking together of the parts, as with glue or cement, because in the case of plastics, there is an actual cohesion or fusing together of the activated plastic materials so that, when hardened, the welt and pegs constitute in effect one integral unit or mass. This results in an exceptionally strong adhesive bond between the outsole and the shoe bottom and yet a bond which does not stiffen the shoe or reduce its flexibility to any appreciable extent. Moreover, since the sole engaging surface 33 of the plastic welt is activated and rendered adhesive throughout its entire width by the solvent or other activator on the outsole, or by the direct application to the welt of a suitable activator or solvent, the portions of the welt outside or beyond the ends of the plastic pegs will be caused to adhere firmly to the leather of the outsole under the sole attaching pressure, as shown in Fig. 7. Consequently, the welt will be secured to the outsole throughout its full width which will tend to reinforce the attachment of the outsole to the shoe bottom, the chief source of strength of the adhesive bond between the outsole and welt, however, being the cohesion which results from the fusing or welding together of the inner ends of the plastic pegs and the adjacent or sole engaging surface of the plastic welt.

Having thus described my invention, what I claim as new and desire to secure by Letters Patent of the United States is:

1. That improvement in methods of making shoes which comprises securing a welt of synthetic plastic material to the overlasted upper of a welt shoe, providing an outsole having synthetic plastic material inserted in its marginal portion located substantially flush with the attaching surface of the outsole, applying cement to the marginal portion of the attaching surface of the outsole to render it and the synthetic plastic material adhesive, and pressing the outsole against the shoe bottom to cause said cement to activate the synthetic plastic welt and render it adhesive and thereby to cause said welt and said outsole to become cement attached to each other.

2. That improvement in methods of making shoes which comprises securing a welt composed of synthetic plastic material to the overlasted upper of a welt shoe, providing an outsole having synthetic plastic material compatible with that of the welt inserted in its marginal portion with the synthetic plastic material located substantially flush with the attaching surface of the outsole, activating the synthetic plastic material in the outsole by a solvent applied to the attaching surface of the outsole to render said synthetic plastic material adhesive, and pressing the outsole against the shoe bottom to cause the activated material of the outsole to activate the synthetic plastic welt and thereby to cause the outsole to become adhesively attached to said welt.

3. That improvement in methods of making shoes which comprises securing a welt composed of plastic material to the overlasted upper of a welt shoe, providing an outsole having pegs of plastic material inserted in its marginal portion with the inner ends of the pegs located substantially flush with the attaching surface of the outsole, activating the inner ends of the pegs to render them adhesive, activating the sole engaging surface of the plastic welt, and pressing the outsole against the shoe bottom to cause the pegs to adhere to the welt, thereby permanently attaching the outsole to the welt.

4. That improvement in methods of making welt shoes which comprises securing a welt composed of plastic material to the overlasted upper of a welt shoe, providing an outsole having plastic pegs extending around its marginal portion with the inner ends of the pegs located substantially flush with the attaching surface of the outsole, applying cement to the marginal portion of the attaching surface of the outsole to render said surface and said pegs adhesive, and pressing the outsole against the shoe bottom to cause the cement on said outsole to activate the plastic welt and render it adhesive and thereby to effect the cement attachment of the outsole to the welt.

5. That improvement in methods of making shoes which comprises securing a welt of synthetic plastic material to the overlasted upper of a welt shoe, providing an outsole having the same kind of synthetic plastic material as the welt inserted in its marginal portion and located substantially flush with the attaching surface of the outsole, activating the marginal portion of said attaching surface with cement to render it and the synthetic plastic material therein adhesive, and pressing the outsole against the shoe bottom to cause the activated material of the outsole to activate the synthetic plastic welt to cause the welt to adhere to said marginal portion and to the synthetic plastic material therein, thereby permanently attaching the outsole to the shoe bottom.

6. That improvement in methods of making shoes which comprises securing a welt of plastic material to the overlasted upper of a welt shoe by inseam stitches, trimming the inseam and beating the welt, providing an outsole having a row of pegs of plastic material extending through holes bored in its marginal portion with the opposite ends of the pegs positioned substantially flush with the adjacent surfaces of the outsole, said pegs being located relatively close together, activating the marginal portion of the attaching surface of the outsole to render it and the inner ends of the pegs adhesive, and positioning the outsole on the shoe bottom and applying pressure thereto to cement attach the outsole to the shoe by causing the adhesive portions of the outsole and pegs to render the plastic welt adhesive and thereby to effect the permanent attachment of the outsole to the welt.

7. That improvement in methods of making shoes which comprises securing a welt of plastic material to the overlasted bottom of a welt shoe, providing an outsole having a row of pegs of plastic material compatible with that of the welt inserted in its marginal portion with the inner ends of the pegs located substantially flush with the attaching surface of the outsole, activating the sole engaging surface of the welt to render it adhesive, and pressing the outsole against the shoe bottom to cause the activated welt to activate the plastic pegs in the outsole and to render them and the adjacent marginal portion of the outsole adhesive, thereby causing the outsole to become permanently attached to the shoe bottom.

8. That improvement in methods of making shoes which comprises securing a welt composed of vinyl resin to the overlasted upper of a welt shoe, providing an outsole having pegs of vinyl resin inserted in its marginal portion with the inner ends of the pegs located substantially flush with the attaching surface of the outsole, applying acetone to the marginal portion of the attaching surface of the outsole to render said surface and said pegs adhesive, and pressing the outsole against the shoe bottom to cause the adhesive outsole and pegs to activate the welt and thereby to cause the outsole to become adhesively attached to the shoe bottom.

9. That improvement in methods of making shoes which comprises securing an upper in overlasted relation to an insole on a last, stitching to the upper and insole a welt composed of plastic material, providing an outsole having pegs of plastic material compatible with that of the welt spaced around its marginal portion with the inner ends of the pegs located substantially flush with the attaching face of the outsole, applying cement to the marginal portion of the outsole and to the sole engaging surface of the plastic welt to activate the welt and pegs and render them adhesive, and adhesively attaching the outsole to the shoe by pressing the outsole against the shoe bottom to cause the pegs and outsole to adhere to the plastic welt.

10. A shoe comprising an upper, an insole, an outsole, and a welt, said outsole having pegs of plastic material secured in its marginal portion with the inner ends of the pegs located substantially flush with the attaching surface of the outsole, said outsole being permanently attached to the welt by cement and by the adhesive character of said pegs.

11. A shoe comprising an upper, an insole, an outsole, and a welt composed of plastic material, said outsole having pegs of plastic material compatible with that of the welt inserted in its marginal portion, and said outsole and welt being permanently bonded together by a cement which activates both the pegs and the welt and causes them to adhere to each other.

12. A shoe comprising an upper, an insole, an outsole, and a welt composed of plastic material, and plastic pegs in the marginal portion of the outsole composed of the same kind of plastic material as the welt, said pegs engaging the plastic welt and being adhesively bonded thereto, thereby securing the outsole permanently to the shoe bottom.

13. A shoe comprising an upper, a ribbed insole, an outsole, and a welt of plastic material secured to the upper and insole rib by fastenings inserted through the welt, upper and insole rib, pegs of plastic material compatible with that of the welt extending through the marginal portion of the outsole with the inner ends of the pegs located substantially flush with the attaching surface of the outsole, said outsole being permanently attached to the shoe bottom by the adhesion of the inner ends of said plastic pegs to the sole engaging surface of the plastic welt.

14. A shoe comprising an upper, an insole, an outsole, and a welt composed of vinyl resin stitched to the upper and insole, pegs of vinyl resin extending through holes in the marginal portion of the outsole with the inner ends of the pegs substantially flush with the attaching surface of the outsole, said pegs being located relatively close to each other in a row extending around said marginal portion, the inner ends of said pegs engaging the adjacent surface of the plastic welt and being adhesively welded thereto, thereby permanently attaching the outsole to the shoe bottom.

15. A shoe comprising an upper, an insole, an outsole, and a welt composed of plastic material, said outsole having pegs of plastic material compatible with that of the welt secured in its marginal portion, the inner ends of said pegs being bonded to the plastic welt, and means for preventing said pegs from being pulled through the outsole in the direction of the welt under the strain and tension on the outsole during wearing of the shoe.

16. A shoe comprising an upper, an insole, an outsole, and a plastic welt secured to said upper and insole, said outsole having pegs of plastic material secured in its marginal portion, said pegs engaging said welt and being adhesively secured thereto to hold the outsole on the shoe bottom, said pegs having annular shoulders thereon facing in the direction of said welt to prevent the pegs from being pulled upwardly through the outsole during wearing of the shoe.

17. A shoe comprising an upper, an insole, an outsole, and a welt composed of plastic material secured to the upper and insole by fastenings, said outsole having pegs of plastic material compatible with that of the welt inserted in its marginal portion with the inner ends of the pegs located substantially flush with the attaching surface of the outsole, said pegs being attached to said welt by cement and by the adhesive nature of the plastic material of the pegs and welt, said pegs being fastened in the marginal portion of the outsole by pins inserted into the edge face of the outsole and passing through said pegs.

JOHN J. BROPHY.

REFERENCES CITED

The following references are of record in the file of this patent:

UNITED STATES PATENTS

| Number | Name | Date |
| --- | --- | --- |
| 2,339,290 | O'Gorman | Sept. 14, 1943 |
| 1,618,729 | Richardson | Feb. 22, 1927 |
| 2,257,026 | Szover | Sept. 23, 1941 |
| 2,350,852 | Wehr | June 6, 1944 |
| 2,042,483 | Richardson | June 2, 1936 |
| 1,952,329 | McKenna | Mar. 27, 1934 |